United States Patent [19]
Harada et al.

[11] Patent Number: 5,968,685
[45] Date of Patent: Oct. 19, 1999

[54] BATTERY ELECTRODE SUBSTRATE AND PROCESS FOR PRODUCING THE SAME

[75] Inventors: Keizo Harada; Kenichi Watanabe; Shosaku Yamanaka, all of Itami; Kiyoshi Hayashi, Neyagawa; Nobuyasu Morishita, Fujiidera; Hiroki Takeshima, Fujisawa; Hideo Kaiya, Chigasaki; Munehisa Ikoma, Nara, all of Japan

[73] Assignees: Sumitomo Electric Industries, Ltd.; Matsushita Electric Industrial Co., Ltd., both of Japan

[21] Appl. No.: 09/135,955

[22] Filed: Aug. 18, 1998

Related U.S. Application Data

[62] Division of application No. 08/717,191, Sep. 20, 1996, Pat. No. 5,851,599.

[30] Foreign Application Priority Data

Sep. 28, 1995 [JP] Japan ................................. 7-250920
Dec. 18, 1995 [JP] Japan ................................. 7-328880
Jul. 12, 1996 [JP] Japan ................................. 8-183556

[51] Int. Cl.$^6$ ..................................................... H01M 4/70
[52] U.S. Cl. .......................... 429/245; 429/235; 429/236; 427/126.6; 264/104
[58] Field of Search ..................................... 429/235, 236, 429/241, 242, 245; 427/126.6, 227, 244; 264/104, 105

[56] References Cited

U.S. PATENT DOCUMENTS

| | | |
|---|---|---|
| 3,325,280 | 6/1967 | Horn et al. |
| 3,615,833 | 10/1971 | Jost ............................................ 136/28 |
| 4,064,331 | 12/1977 | Patton et al. ............................ 429/221 |
| 4,233,378 | 11/1980 | Joo et al. ................................. 429/220 |
| 4,236,927 | 12/1980 | Buhl et al. ................................. 75/246 |
| 4,663,256 | 5/1987 | Corrigan ................................. 429/223 |
| 5,681,673 | 10/1997 | Hattori et al. ........................... 429/235 |

FOREIGN PATENT DOCUMENTS

2-19406   1/1990   Japan ................................ B22F 5/00

*Primary Examiner*—Maria Nuzzolillo
*Assistant Examiner*—Carol Chaney
*Attorney, Agent, or Firm*—Bierman, Muserlian and Lucas

[57] ABSTRACT

A battery electrode substrate which is constituted of a porous metallic body structure having communicating pores at a porosity of at least 90% and an Fe/Ni multilayer structure wherein the skeletal portion of the porous metallic body is composed mainly of Fe and has an Ni covering layer on the surface thereof while pores communicating with the inside and outside of Fe skeletal portion exist in the Fe skeletal portion and the inside of the pores is covered with Ni. The electrode substrate is produced by applying an iron oxide powder of at most 20 $\mu$m in an average particle size on a porous resin core body; heat treating the core to remove an organic resin component while simultaneously sintering Fe to obtain a porous Fe body; and then covering the Fe skeletal portion with Ni by electroplating. In this process, the iron oxide can be used in combination with carbon powder. Further, a nickel porous sintered body can also be produced using nickel oxide in place of iron oxide.

4 Claims, 1 Drawing Sheet

BATTERY ELECTRODE SUBSTRATE AND PROCESS FOR PRODUCING THE SAME

PRIOR APPLICATION

This application is a division of U.S. patent application Ser. No. 717,191 filed Sep. 20, 1996, now U.S. Pat. No. 5,851,599.

BACKGROUND OF THE INVENTION

1. Field of the Invention

The present invention relates to a process for producing a porous metallic material to be used as an electrode substrate for use in an alkaline secondary battery principally such as a nickel-cadmium battery, a nickel-zinc battery or a nickel-hydrogen battery.

2. Description of the Prior Art

Storage batteries for use as various electric power sources include lead storage batteries and alkaline storage batteries. Among them, the alkaline storage batteries have been widely used in various portable apparatuses in the form of a miniature battery and in industrial applications in the form of a large-sized one, for example, because they can be expected to be high in reliability and can be miniaturized to be lightweight. In these alkaline storage batteries, materials for negative electrodes include zinc, iron, hydrogen, etc. in addition to cadmium. However, positive electrodes are nickel electrodes in almost all cases though an air electrode, a silver oxide electrode, etc. are partially adopted. Replacement of a sintered type for a pocket type has attained improvements in properties and enabled hermetic sealing thereof to widen the scope of uses thereof.

In a common powder-sintered type substrate, however, the strength thereof is greatly lowered when the porosity thereof is set to be at least 85%. Thus, there is a limit to filling it with an active material. Accordingly, there is a limit to increasing the capacity of a battery. In view of the above, a foamed substrate and a fibrous substrate have been adopted and put into practical use as substrates having a far higher porosity of at least 90% or the like in place of the sintered substrate. Processes for producing such a high-porosity porous metallic body substrate include a plating process as disclosed in Japanese Patent Laid-Open No. 174,484/1982, and a sintering process as disclosed in Japanese Patent Publication No. 17,554/1963 and the like. The plating process is a method wherein the skeletal surface of a foamed resin such as a urethane foam is coated with a carbon powder or the like to effect such a treatment thereof as to be rendered electrically conductive, and further subjected to Ni electrodeposition by electroplating, followed by burning out the foamed resin and the carbon to obtain a porous metallic material. On the other hand, according to the sintering process, the skeletal surface of a foamed resin such as a urethane foam is dipped in and coated with a slurry of a metal powder, followed by heating to sinter the metal powder.

As shown in the prior art, application of a porous metallic body to a battery plate substrate has made a great contribution to an increase in the capacity of a battery. In production of a porous metallic body according to the plating process as disclosed in Japanese Patent Laid-Open No. 174,484/1982, however, a porous resin core body must be coated with carbon to effect such a treatment thereof as to be rendered electrically conductive for electroplating. Carbon is necessary only in a step of production, but unnecessary in the porous metallic body because it is finally burnt out. Thus, coating the core body with carbon for such a treatment to make it electrically conductive not only entails an increase in the cost of a product, but also is believed to affect the quality of the product because of residual carbon. In this respect, an improvement has been desired. On the other hand, the production of a porous metallic body according to the sintering process as disclosed in Japanese Patent Publication No. 17,554/1963 does not fundamentally involve the above-mentioned problems, but can hardly secure desirable properties such as mechanical strength properties and electrical properties required of a battery plate substrate because dense sintering of a skeletal portion in the form of a porous body is difficult. On the other hands Japanese Patent Publication No. 4,136/1994, directed to a process for producing a porous iron catalyst carrier, also discloses a method of obtaining a porous Fe body using an iron powder, an iron oxide powder, etc. According to this method, however, no properties required of a battery electrode substrate can be secured like in the foregoing cases, for example, because none other than a porous sintered body having a coarse skeletal portion can be obtained.

SUMMARY OF THE INVENTION

Under such circumstances, an object of the present invention is to provide a battery electrode substrate decreased in residual carbon content and having excellent mechanical strength properties and electrical properties, and a process for producing the same at a low production cost.

As a result of intensive investigations, the inventors of the present invention have found out that it is important that an electrode substrate have an Fe/Ni multilayer structure made of a porous body having the skeletal portion thereof consisting mainly of Fe and having the surface thereof covered with Ni, provided that the inside of communicating pores in Fe skeletal portion is covered with Ni as well; that it is important that iron oxide or nickel oxide having a controlled particle size be used as a starting material powder in producing such an electrode substrate; and that, in the case of an iron oxide powder, use of a carbon powder in combination therewith is advantageous. The present invention has been completed based on these findings.

Specifically, the present invention is directed to:

(1) a battery electrode substrate as an active material carrier for use in a battery collector, the battery electrode substrate being constituted of a porous metallic body structure having communicating pores at a porosity of at least 90% and an Fe/Ni multilayer structure wherein the skeletal portion of the porous metallic body is composed mainly of Fe and has an Ni covering layer on the surface thereof while pores communicating with the inside and outside of Fe skeletal portion exist in the Fe skeletal portion and the inside of the pores is covered with Ni;

(2) a process for producing a battery electrode substrate, comprising: applying an iron oxide powder of at most 20 $\mu$m in an average particle size on a porous resin core body having the skeletal surface thereof made tacky; effecting a heat treatment in a reducing atmosphere within a temperature range of 950° C. to 1,350° C. to remove an organic resin component while simultaneously sintering Fe to obtain a porous Fe body having a carbon content of at most 0.2% and a porosity of at least 90%; and then covering the surface of the Fe skeletal portion with Ni by Ni electroplating;

(3) a process for producing a battery electrode substrate, comprising: mixing an iron oxide powder of at most 20

μm in an average particle size with a binder resin and a diluent such as water or an organic solvent to prepare a slurry; applying the slurry on a porous resin core body and then drying the same; thereafter effecting a heat treatment in a reducing atmosphere within the temperature range of 950° C. to 1,350° C. to remove an organic resin component while simultaneously sintering Fe to obtain a porous Fe body having a carbon content of at most 0.2% and a porosity of at least 90%; and then covering the surface of the Fe skeletal portion thereof with Ni by Ni electroplating;

(4) a process for producing a battery electrode substrate, comprising: applying a powder mixture of a carbon powder and an iron oxide powder of at most 20 μm in an average particle size on a porous resin core body having the skeletal surface thereof made tacky; effecting a heat treatment thereof in a nonoxidizing atmosphere within a temperature range of 850° C. to 1,250° C. to remove an organic resin component while simultaneously sintering Fe to obtain a porous Fe body having a carbon content of at most 0.2% and a porosity of at least 90%; and then covering the surface of the Fe skeletal portion with Ni by Ni electroplating;

(5) a process for producing a battery electrode substrate, comprising: mixing a carbon powder and an iron oxide powder of at most 20 μm in an average particle size with a binder resin and a diluent such as water or an organic solvent to prepare a slurry; applying the slurry on a porous resin core body and then drying the same; thereafter effecting a heat treatment in a nonoxidizing atmosphere within a temperature range of 850° C. to 1,250° C. to remove the organic resin component while simultaneously sintering Fe to obtain a porous Fe body having a carbon content of at most 0.2% and a porosity of at least 90%; and then covering the surface of the Fe skeletal portion with Ni by Ni electroplating;

(6) a process for producing a battery electrode substrate, comprising: mixing an iron oxide powder of at most 20 μm in an average particle size with a binder resin and a diluent such as water or an organic solvent to prepare a slurry in such a way that the residual carbon rate of the binder resin and the blending proportion of the binder resin to the iron oxide satisfy the relationship of the following formula; applying the slurry on a porous resin core body and then drying the same; thereafter effecting a heat treatment in an atmosphere of an inert gas at a temperature of 900° C. to 1,250° C. to carbonize the binder resin while reduction-sintering iron oxide with the resulting carbonization product; thereafter effecting a heat treatment for reduction-sintering the nonreduced part of iron oxide in a reducing atmosphere at a temperature of 900° C. to 1,350° C. to remove the organic resin component while simultaneously sintering Fe to obtain a porous Fe body having a carbon content of at most 0.2% and a porosity of at least 90%; and then covering the surface of the Fe skeletal portion thereof with Ni by Ni electroplating:

$$3 < a \times b < 11$$

a: residual carbon rate % of binder resin, provided that a>30 b: amount of the binder resin blended/amount of iron oxide blended;

(7) a process for producing a battery electrode substrate as set forth in any one of (2) to (5) above, wherein the thickness of the resulting Ni covering layer is 0.1 μm to 10 μm;

(8) a process for producing a battery electrode substrate as set forth in any one of (2) to (5) above, wherein the iron oxide powder has an average particle size of at most 3 μm;

(9) a process for producing a battery electrode substrate as set forth in (4) or (5) above, wherein the amount of the carbon powder is 0.1 wt. % to 20 wt. % based on the iron oxide powder;

(10) a process for producing a battery electrode substrate, comprising: applying an Ni oxide powder of at most 20 μm in an average particle size on a porous resin core body having the skeletal surface thereof made tacky; and effecting a heat treatment in a reducing atmosphere within the temperature range of 900° C. to 1,300° C. to remove an organic resin component while simultaneously sintering Ni to form a porous Ni body having a carbon content of at most 0.2% and a porosity of at least 90%;

(11) a process for producing a battery electrode substrate, comprising: mixing an Ni oxide powder of at most 20 μm in an average particle size with a binder resin and a diluent such as water or an organic solvent to prepare a slurry; applying the slurry on a porous resin core body and then drying the same; and thereafter effecting a heat treatment in a reducing atmosphere within the temperature range of 900° C. to 1,300° C. to remove the organic resin component while simultaneously sintering Ni to form a porous Ni body having a carbon content of at most 0.2% and a porosity of at least 90%; and

(12) a process for producing a battery electrode substrate as set forth in (10) or (11), wherein the Ni oxide powder has an average particle size of at most 3 μm.

DETAILED DESCRIPTION OF THE PREFERRED EMBODIMENTS

Figure 1:
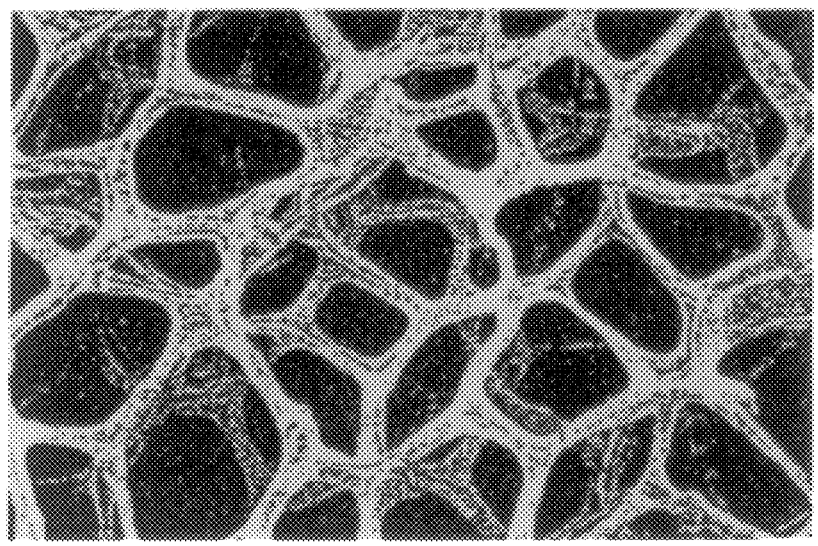
FIG. 1 is a microscopic photograph of a battery electrode substrate of the present invention wherein the skeletal portion consisting mainly of Fe has the surface thereof covered with Ni.
Figure 2:
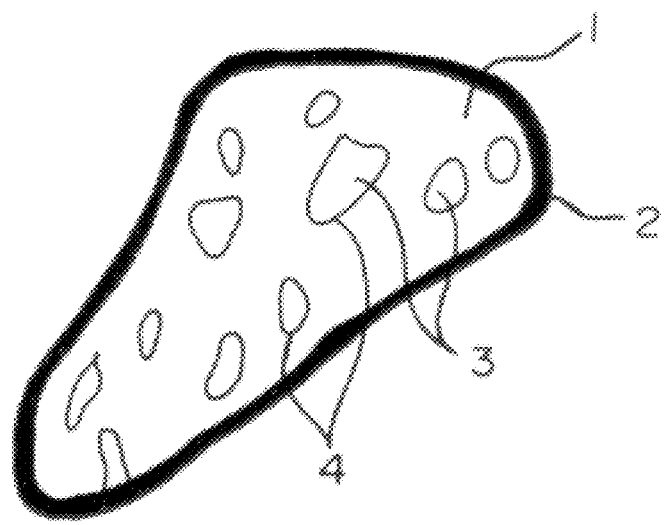
FIG. 2 is a model cross-sectional view of the Fe skeletal portion as shown in FIG. 1, which view is perpendicular to the longitudinal direction thereof.

The battery electrode substrate of the present invention is characterized in that the porous body structure thereof as shown in FIG. 1 has the skeletal portion 1 thereof made mainly of Fe and having an Ni covering layer 2 on the surface thereof, and that pores 3 communicating with the interior and surface thereof exist in the Fe skeletal portion in which the inside of the pores 3 covered with an Ni layer 4, as shown in FIG. 2, which is a model cross-sectional view of the skeletal portion 1 which view is perpendicular to the longitudinal direction thereof.

In producing a battery plate substrate as a collector of a porous metallic body, a part of the skeletal portion of the porous body is inevitably fractured in a pressing step, a winding step in the case of a cylindrical battery, etc. after filling thereof with an active material as a reactive substance in a battery. In the case of an Fe/Ni multilayer structure, no problems arise in the surface of the skeletal portion covered with Ni. However, Fe-exposed parts unavoidably exist on the fractured cross sections of the skeletal portion. The Fe-exposed parts are corroded in an electrolyte in a battery to cause self-discharge and deterioration of life properties due to dissolution out of Fe as well as deterioration of current collection properties due to formation of nonconducting films, etc. to thereby lower the performance of the battery.

It has however been found out that the areas of the Fe-exposed parts are relatively decreased even in the fractured cross-sectional parts in the structure of the present invention to enable the lowering of the performance of a battery to be suppressed because an Ni covering layer is formed also on the inside of the Fe skeletal portion via the communicating pores.

The process of the present invention for producing a battery electrode substrate, which will now be described in detail, makes a great feature of using an iron oxide powder to form a porous Fe body portion through reduction sintering thereof. Specifically, channels of gas formed during the reduction of iron oxide form communicating pores in the final porous Fe body, and the walls of these pores are covered with Ni through Ni electroplating to obtain the structure of the present invention.

In the process of the present invention for producing a battery electrode substrate, employable methods of imparting tack to a porous resin core body include a method wherein a porous resin core body is dipped in a liquid mixture of a binder resin and a diluent such as water or an organic solvent and then stripped of excess of the attached component with rolls or the like, and a method wherein the above-mentioned liquid mixture is sprayed on a porous resin core body with a spray. On the other hand, employable methods of application of the iron oxide powder, the powder mixture of the carbon powder and the iron oxide powder, or the nickel oxide powder include a method wherein the powder is sprayed on a porous resin with an air gun, and a method wherein the porous resin core body is swayed in the powder.

On the other hand, methods of slurrying the iron oxide powder, the powder mixture of the carbon powder and the iron oxide powder, or the nickel oxide powder include a method wherein the iron oxide powder, the powder mixture of the carbon powder and the iron oxide powder, or the nickel oxide powder is milked with a binder resin, usable examples of which include acrylic resins and phenolic resins, and a diluent such as water or an organic solvent at a predetermined mixing proportion, followed by stirring, whereby a slurry can be prepared. Employable methods of applying the slurry on the porous resin core body include a method wherein a porous resin is impregnated with the slurry and then stripped of an excess of the impregnating component with squeeze rolls, and a method wherein the slurry is sprayed with a spray.

Next, the porous resin coated with the iron oxide powder or the nickel oxide powder according to one of the foregoing methods is heat-treated in a reducing atmosphere to remove the organic resin component including the resin core body and the binder resin while simultaneously reducing iron oxide to iron or nickel oxide to nickel and sintering the iron or nickel.

The average particle size of the iron oxide or nickel oxide powder to be used in the present invention is preferably at most 20 $\mu$m, still preferably at most 5 $\mu$m, further preferably at most 3 $\mu$m. In the case of using the powder mixture of the carbon powder and the iron oxide powder, the most preferable particle size of the iron oxide powder is at most 1 $\mu$m.

When the average particle size exceeds 20 $\mu$m, the complete reduction of iron oxide to iron or nickel oxide to nickel is time-consuming to prolong the heat treatment time, thereby not only presenting a practical problem of high production cost but also involving insufficient reduction, because of which dense sintering of the skeletal portion cannot be secured to lower the mechanical properties and electrical properties thereof, leading to a failure in securing properties required of a battery electrode substrate.

Use of a particulate powder having an average particle size of at most 5 $\mu$m as the iron oxide powder or the nickel oxide powder further produces, for example, such effects that (1) dense and uniform application on the porous resin core body is possible, that (2) reduction to iron or nickel can be easily effected in a short time, and that (3) reduced iron or nickel is so particulate as well and hence so good in sintering properties as to obtain a dense sintered body. Further, as opposed to the use of an iron powder or a nickel powder as a starting material as in the prior art, the use of the iron oxide powder or the nickel oxide powder in the present invention gives the following important functions and effects:

(4) Oxygen formed during the reduction of iron oxide or nickel oxide reacts with the organic resin component including the resin core body and the binder resin to yield carbonic acid gas, whereby the organic component can be efficiently removed. Where a heat treatment is effected in a reducing atmosphere, a part of the organic resin component usually remains in a carbonized form to effect solid solution into the porous metallic body to thereby present a problem of adversely affecting the electric resistance and strength properties thereof, as well as to be attached as soot to a furnace wall to thereby present a problem of making the maintenance of a heat treatment furnace necessary. These problems have however been solved according to the present invention.

(5) A particulate iron powder involves a risk of ignition, explosion, etc., and hence needs precaution in handling thereof. Further, the powder itself is expensive. By contrast, a particulate iron oxide powder is inexpensive and easy of handling.

On the other hand, in the case of using the powder mixture of the carbon powder and the iron oxide powder, the particle size of the carbon powder is preferably at most 20 $\mu$m, still preferably at most 5 $\mu$m.

In an embodiment of the present invention wherein use is made of a powder mixture of carbon powder and iron oxide powder, it has been found out that addition of the carbon powder more easily promotes the reduction reaction of iron oxide to enable lowering of the sintering temperature and shortening of the sintering time. The amount of carbon to be added is preferably 0.1 wt. % to 20 wt. % based on iron oxide. When it is smaller than 0.1 wt. %, the effect of lowering the sintering temperature and shortening the sintering time by addition of carbon is not observed. When it exceeds 20 wt. %, carbon remains in the resulting sintered body to deteriorate the strength properties and electrical properties thereof because it exceeds the necessary amount for reduction of iron oxide by a great deal.

Examples of the atmosphere to be used in the heat treatment according to the present invention include hydrogen gas, a decomposition gas of ammonia, a mixed gas of hydrogen and nitrogen, and nitrogen gas. In the case of iron oxide, the heat treatment temperature is set to be 950° C. to 1,350° C. as the necessary temperature for reduction and sintering. Herein, when the temperature is lower than 950° C., reduction and sintering do not sufficiently proceed. When it exceeds 1,350° C., the porous skeletal structure cannot be maintained and hence turns into a flat plate sintered body.

Further, it is still preferably 1,100° C. to 1,300° C. In the case of using a powder mixture of carbon powder and iron oxide powder, the heat treatment temperature is set to be 850° C. to 1,250° C., preferably 950° C. to 1,150° C. On the other hand, in the case of nickel oxide powder, it is 900 to 1,300° C., preferably 1,000 to 1,250° C.

Further, the following process is proposed as a preferred embodiment of the present invention with a view to realizing electrical properties and mechanical properties required of a battery electrode substrate even according to a continuous heat treatment mode involving a rapid heat-up stage for increasing the throughput in the sintering step.

In the step of mixing iron oxide powder with a binder resin and a diluent such as water or an organic solvent to form a slurry, it is preferred that the residual carbon rate of the binder resin and the blending proportion of the binder resin to iron oxide satisfy the relationship of the following formula:

$$3 < a \times b < 11$$

a: residual carbon rate % of the binder resin, provided that a>30 b: amount of the binder resin blended/amount of iron oxide blended

Herein, the term "residual carbon rate" means the percentage (%) of the residual carbon content with respect to the initial weight of the binder resin measured according to the method specified in JIS (Japanese Industrial Standard) 2270.

On the other hand, the heat treatment of the porous resin core body coated with the slurry for formation of an Fe-sintered porous body preferably comprises a first step of heat treatment to be effected in an atmosphere of an inert gas at 900° C. to 1,250° C. to carbonize the binder resin while reduction-sintering iron oxide with the resulting carbonization product, and a subsequent second step of heat treatment to be effected in an atmosphere of a reducing gas at a temperature of 900° C. to 1,350° C. to reduction-sinter the nonreduced part of iron oxide. Herein, $N_2$, Ar, etc. can be used as the inert gas, while $H_2$, $NH_3$, etc. can be used as the reducing gas. In the continuous heat treatment mode, works are rapidly heated up at a rate of 100° C./min or more because the works are continuously introduced into a furnace heated up to a predetermined temperature. In the course of such rapid heat-up, the porous resin core body coated with the iron oxide slurry may sometimes be burnt out at a stroke to vanish the skeletal structure-maintaining body of the porous body. In such a case, since the structure-maintaining body disappears before reduction sintering of the iron oxide powder, none other than an Fe sintered body having a large number of fractured skeletal parts can be obtained, resulting in a failure in securing desired properties as an electrode substrate. In view of the above, according to a preferred embodiment of the present invention, there is proposed a method wherein a skeletal structure-maintaining body is secured through carbonization of the binder resin after the porous resin core body is burnt out. For that purpose, it has been found out that the residual carbon rate of the binder resin and the blending proportion thereof to iron oxide must satisfy the relationship of the foregoing formula. Herein, when a is lower than 30% or when a×b is smaller than 3, the carbonization product is so insufficient in functioning as the skeleton-maintaining body that desired properties cannot be secured due to an increase in skeletal fracture. On the other hand, when a×b exceeds 11, it has been found out that an excess of the carbonization product over that required for complete reduction of iron oxide remains to inhibit sintering of Fe formed through reduction, whereby a dense sintered body cannot be obtained with great decreases in the strength properties etc. thereof.

Further, as for the steps of heat treatment, it is an important requirement to effect the first step thereof in an atmosphere of an inert gas. In the first step of heat treatment, carbonization of the binder resin and reduction sintering of iron oxide only with the carbonization product are effected. This enables not only the skeletal structure to be maintained after the resin core body is burnt out, but also the carbonization product, which finally becomes unnecessary, to be consumed by reduction of iron oxide. At the point of time of completion of the first step, almost all the carbonization product has been removed while obtaining a composite sintered body of Fe and iron oxide by partial reduction of the iron oxide powder. In the subsequent second step of heat treatment, the nonreduced iron oxide is completely reduced with the atmosphere of the reducing gas while allowing the sintering of Fe to proceed.

According to the foregoing method, a porous Fe body structure with little skeletal fracture can be obtained even in the continuous heat treatment mode involving a stage of rapid heat-up, whereby electrical properties and mechanical properties required of a battery electrode substrate can be realized.

According to the foregoing procedure, a porous iron or nickel body having a carbon content of at most 0.2% and a porosity of at least 90% can be obtained. Herein, since the carbon content is low due to the aforementioned effect of using the iron oxide powder or the nickel oxide powder, a porous iron or nickel body having a good electric conductivity and excellent mechanical strengths such as elongation properties in particular can be obtained, wherein properties required of a battery electrode substrate can be secured.

Next, the porous iron body obtained according to the foregoing method is Ni-electroplated to form an Ni film and to thereby obtain a porous metallic body having a strong corrosion resistance in a strongly alkaline solution in an alkaline secondary battery in particular. After Ni electroplating, it is preferably further heat-treated in a non-oxidizing atmosphere to enable an improvement in the adhesion of the Ni film and relaxation of residual stress due to the plating. Herein, the heat treatment temperature is preferably at most 600° C. On the other hand, the thickness of the Ni film is preferably 0.1 $\mu$m to 10 $\mu$m. When it is smaller than 0.1 $\mu$m, no sufficient corrosion resistance can be secured. When it exceeds 10 $\mu$m, the porosity becomes lower. It is still preferably at least 1 $\mu$m.

EXAMPLE 1

A polyurethane foam of 2.5 mm in thickness wherein the number of pores per inch was about 50 was dipped in a binder resin liquid prepared by mixing 60 wt. % of an acrylic resin with 40 wt. % of water, and then stripped of an excess of the dip coating component with squeeze rolls to form a porous resin core body coated with the binder. Subsequently, an $\alpha$-$Fe_2O_3$ powder as shown in Table 1 was directly sprayed on the porous resin core body with an air gun, followed by drying in the air at 150° C. for 5 minutes. On the other hand, a sample (No. 8) as comparative example was also formed using an iron powder. Subsequently, a heat treatment was effected in a hydrogen stream at 1,280° C. for 10 minutes for sintering to form porous Fe bodies. The properties of these porous Fe bodies were evaluated. The results are shown in Table 2.

TABLE 1

| Sample No. | Average Particle Size (μm) |
| --- | --- |
| 1 | 0.8 |
| 2 | 2.1 |
| 3 | 4.5 |
| 4 | 10.5 |
| 5 | 17 |
| 6 | 40 |
| 7 | 100 |
| 8 | 40 (iron powder) |

TABLE 2

| Sample No. | Carbon Content (wt. %) | Porosity (%) | Electric Resistance (mΩ/100 mm) | Tensile Strength (kg/15 mm) | Elongation (%) |
| --- | --- | --- | --- | --- | --- |
| 1 | 0.05 | 95 | 52 | 3.1 | 4.5 |
| 2 | 0.03 | 95 | 53 | 3.2 | 4.8 |
| 3 | 0.08 | 94 | 61 | 2.4 | 2.6 |
| 4 | 0.05 | 94 | 65 | 2.2 | 2.2 |
| 5 | 0.07 | 94 | 69 | 2.1 | 2.0 |
| 6 | 0.09 | 93 | 77 | 1.4 | 1.5 |
| 7 | 0.04 | 90 | 83 | 1.3 | 1.2 |
| 8 | 0.5 | 94 | 120 | 1.2 | 1.1 |

Electric Resistance: electric resistance for a width of 10 mm and a length of 100 mm.

EXAMPLE 2

The samples of Example 1 were Ni-plated in an Ni electroplating Watts bath at an electric current density of 10 A/dm$^2$ to form Ni films of 2 μm in thickness. The properties of the resulting samples are shown in Table 3.

TABLE 3

| Sample No. | Carbon Content (wt. %) | Porosity (%) | Electric Resistance (mΩ/100 mm) | Tensile Strength (kg/15 mm) | Elongation (%) |
| --- | --- | --- | --- | --- | --- |
| 1 | 0.05 | 94 | 41 | 3.4 | 4.4 |
| 2 | 0.03 | 94 | 43 | 3.5 | 4.7 |
| 3 | 0.08 | 93 | 51 | 2.5 | 2.7 |
| 4 | 0.05 | 93 | 56 | 2.3 | 2.1 |
| 5 | 0.07 | 93 | 60 | 2.2 | 2.1 |
| 6 | 0.09 | 92 | 68 | 1.5 | 1.4 |
| 7 | 0.04 | 89 | 75 | 1.4 | 1.3 |
| 8 | 0.5 | 93 | 112 | 1.3 | 1.2 |

Electric Resistance: electric resistance for a width of 10 mm and a length of 100 mm.

Subsequently, the substrates shown in the table were used to produce nickel electrodes for use in Ni-hydrogen batteries. They were filled with an active material principally comprising nickel hydroxide, and the surfaces thereof were then smoothed, followed by drying at 120° C. for 1 hour. The resulting electrodes were pressed under a pressure of 1 ton/cm$^2$ to have a length of 180 mm, a width of 220 mm and a thickness of 0.7 mm.

5 nickel electrodes for each sample, 6 conventional MmNi (misch metal nickel) hydrogen occlusion alloy electrodes as counterpart electrodes, and a polypropylene non-woven fabric separator treated to be rendered hydrophilic were used to constitute a square-shaped closed nickel-hydrogen battery. An aqueous solution of caustic potash having a specific gravity of 1.3 containing 25 g/l of lithium hydroxide dissolved therein was used as the electrolyte. Batteries Nos. 1B, 2B, 3B, . . . correspond to respective Samples Nos. in Table 3.

Each battery was examined with respect to discharge voltage and capacity at discharge currents of 10 A and 150 A, and was further evaluated with respect to capacity retention rate (%) after 500 cycles each involving a 10 A discharge in a life test. The results are shown in Table 4.

TABLE 4

| Battery No | 10 A Discharge | | 150 A Discharge | | Capacity Retention Rate after 500 Cycles (%) |
| --- | --- | --- | --- | --- | --- |
| | V | Ah | V | Ah | |
| 1B | 1.24 | 121 | 1.18 | 119 | 94 |
| 2B | 1.24 | 120 | 1.18 | 119 | 94 |
| 3B | 1.22 | 117 | 1.17 | 111 | 94 |
| 4B | 1.21 | 115 | 1.15 | 110 | 92 |
| 5B | 1.21 | 114 | 1.14 | 108 | 91 |
| 6B | 1.12 | 108 | 1.03 | 97 | 89 |
| 7B | 1.11 | 106 | 1.03 | 96 | 89 |
| 8B | 1.11 | 104 | 0.98 | 93 | 87 |

It has become apparent from the foregoing results that the battery electrode substrate of the present invention exhibits excellent properties.

EXAMPLE 3

Sample 2 of Example 1 was used to form substrates with varied Ni film thicknesses, which were used to produce Ni-hydrogen batteries according to the same procedure as in Example 2. They were examined with respect to capacity retention rate after 500 cycles each involving a 10 A discharge. The results are shown in Table 5.

TABLE 5

| Ni FIlm Thickness (μm) | Capacity Retention Rate (%) |
| --- | --- |
| 0.02 | 72 |
| 0.2 | 90 |
| 1.5 | 93 |
| 4.5 | 94 |

EXAMPLE 4

50 wt. % of an $Fe_3O_4$ powder as shown in Table 6 was blended with 10 wt. % of an acrylic resin, 2 wt. % of carboxymethylcellulose and 38 wt. % of water. The blend was mixed with a ball mill for 12 hours to prepare a slurry. Subsequently, a polyurethane foam of 2.5 mm in thickness wherein the number of pores per inch was about 50 was dipped in the slurry, stripped of an excess of the attached component by roll squeezing, and dried in the air at 120° C. for 5 minutes to prepare a porous resin coated with the $Fe_3O_4$ powder, which was then heat-treated in a hydrogen stream at 1,220° C. for 10 minutes for sintering to form a porous Fe body. The properties of such porous Fe bodies were evaluated. The results are shown in Table 7.

TABLE 6

| Sample No. | Average Particle Size (μm) |
| --- | --- |
| 9 | 0.8 |
| 10 | 2.5 |

TABLE 6-continued

| Sample No. | Average Particle Size (μm) |
|---|---|
| 11 | 15 |
| 12 | 130 |

TABLE 7

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 9 | 0.04 | 95 | 55 | 3.2 | 4.2 |
| 10 | 0.03 | 94 | 54 | 3.3 | 4.4 |
| 11 | 0.05 | 93 | 62 | 2.3 | 2.5 |
| 12 | 0.02 | 90 | 78 | 1.2 | 1.0 |

Electric Resistance: electric resistance for a width of 10 mm and a length of 100 mm.

Samples shown in Table 7 were Ni-plated in an Ni electroplating Watts bath at an electric current density of 12 A/dm$^2$ to form Ni films of 3 μm in thickness. The properties of the resulting samples shown in Table 8.

TABLE 8

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 9 | 0.04 | 94 | 40 | 3.5 | 4.2 |
| 10 | 0.03 | 93 | 41 | 3.6 | 4.3 |
| 11 | 0.05 | 92 | 55 | 2.6 | 2.3 |
| 12 | 0.02 | 89 | 68 | 1.3 | 1.2 |

Electric Resistance: electric resistance for a width of 10 mm and a length of 100 mm.

Subsequently, Ni-hydrogen batteries were produced according to the same procedure as in Example 2, and the properties thereof were evaluated. The results are shown in Table 9.

TABLE 9

| Battery No | 10 A Discharge V | 10 A Discharge Ah | 150 A Discharge V | 150 A Discharge Ah | Capacity Retention Rate after 500 Cycles (%) |
|---|---|---|---|---|---|
| 9B | 1.24 | 123 | 1.19 | 120 | 94 |
| 10B | 1.24 | 121 | 1.18 | 119 | 94 |
| 11B | 1.21 | 116 | 1.16 | 110 | 94 |
| 12B | 1.15 | 110 | 1.10 | 104 | 93 |

EXAMPLE 5

A polyurethane foam of 2.5 mm in thickness wherein the number of pores per inch was about 50 was spray-coated with a binder resin liquid prepared by mixing 70 wt. % of a phenolic resin with 30 wt. % of water to form a porous resin core body coated with the binder. Subsequently, the porous resin core body was swayed in an NiO powder as shown in Table 10 to coat it with the NiO powder. On the other hand, a sample (No. 13) as a comparative example was also formed using an Ni powder. Subsequently, they were heat-treated in a hydrogen stream at 1,180° C. for 10 minutes for sintering to form porous Ni bodies. The properties of these porous Ni bodies were evaluated. The results are shown in Table 11.

TABLE 10

| Sample No. | Average Particle Size (μm) |
|---|---|
| 13 | 1.2 |
| 14 | 5.6 |
| 15 | 18 |
| 16 | 60 |

TABLE 11

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 13 | 0.01 | 95 | 39 | 3.3 | 4.5 |
| 14 | 0.02 | 94 | 38 | 3.1 | 4.8 |
| 15 | 0.01 | 93 | 46 | 2.5 | 2.6 |
| 16 | 0.01 | 90 | 63 | 1.5 | 1.1 |

Electric Resistance: electric resistance for a width of 10 mm and a length of 100 mm.

EXAMPLE 6

50 wt. % of an NiO powder as shown in Table 12 was blended with 10 wt. % of a phenolic resin, 2 wt. % of carboxymethylcellulose and 38 wt. % of water. The blend was mixed with a ball mill for 12 hours to prepare a slurry. Subsequently, a polyurethane foam of 2.5 mm in thickness wherein the number of pores per inch was about 50 was dipped in the slurry, stripped of an excess of the attached component by roll squeezing, and dried in the air at 120° C. for 5 minutes to prepare a porous resin coated with the NiO powder, which was then heat-treated in a hydrogen stream at 1150° C. for 10 minutes for sintering to form a porous Ni body. The properties of such porous Ni bodies were evaluated. The results are shown in Table 13.

TABLE 12

| Sample No. | Average Particle Size (μm) |
|---|---|
| 17 | 1.5 |
| 18 | 8.6 |
| 19 | 15 |
| 20 | 35 |

TABLE 13

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 17 | 0.02 | 94 | 38 | 3.1 | 4.1 |
| 18 | 0.03 | 93 | 39 | 3.5 | 4.0 |
| 19 | 0.02 | 93 | 45 | 2.6 | 2.3 |
| 20 | 0.03 | 92 | 59 | 1.7 | 1.2 |

Electric Resistance: electric resistance for a width of 10 mm and a length of 100 mm.

EXAMPLE 7

Samples shown in Tables 11 and 13 were used to produce Ni-hydrogen batteries according to the same procedure as in Example 2, and the properties thereof were evaluated. The results are shown in Table 14.

TABLE 14

| Battery | 10 A Discharge | | 150 A Discharge | | Capacity Retention Rate after 500 |
| --- | --- | --- | --- | --- | --- |
| No | V | Ah | V | Ah | Cycles (%) |
| 13B | 1.24 | 121 | 1.20 | 120 | 94 |
| 14B | 1.23 | 120 | 1.19 | 119 | 94 |
| 15B | 1.21 | 117 | 1.14 | 114 | 94 |
| 16B | 1.13 | 109 | 1.08 | 102 | 93 |
| 17B | 1.24 | 122 | 1.19 | 121 | 94 |
| 18B | 1.22 | 118 | 1.18 | 116 | 94 |
| 19B | 1.20 | 117 | 1.18 | 115 | 93 |
| 20B | 1.16 | 115 | 1.14 | 110 | 93 |

EXAMPLE 8

A polyurethane foam of 2.5 mm in thickness wherein the number of pores per inch was about 50 was dipped in a binder resin liquid prepared by mixing 60 wt. % of an acrylic resin with 40 wt. % of water, and then stripped of an excess of the dip coating component with squeeze rolls to form a porous resin core body coated with the binder. Subsequently, a powder mixture of an $\alpha$-$Fe_2O_3$ powder as shown in Table 15 and a graphite powder of 5 μm in an average particle size was directly sprayed on the porous resin core body with an air gun, followed by drying in the air at 150° C. for 5 minutes. On the other hand, a sample (No. 27) as a comparative example was also formed using an iron powder in place of the iron oxide powder. In passing, the carbon powder was mixed in an amount of 5 wt. % based on the iron oxide (iron) powder.

Subsequently, a heat treatment was effected in a hydrogen stream at 1,050° C. for 5 minutes for sintering to form porous Fe bodies. The properties of these porous Fe bodies were evaluated. The results are shown in Table 16.

TABLE 15

| Sample No. | Average Particle Size (μm) |
| --- | --- |
| 21 | 0.6 |
| 22 | 1.5 |
| 23 | 4.5 |
| 24 | 15 |
| 25 | 50 |
| 26 | 150 |
| 27 | 50 (iron powder) |

TABLE 16

| Sample No. | Carbon Content (wt. %) | Porosity (%) | Electric Resistance (mΩ/100 mm) | Tensile Strength (kg/15 mm) | Elongation (%) |
| --- | --- | --- | --- | --- | --- |
| 21 | 0.05 | 95 | 48 | 3.5 | 4.9 |
| 22 | 0.04 | 95 | 50 | 3.4 | 4.5 |
| 23 | 0.09 | 94 | 60 | 2.6 | 2.8 |
| 24 | 0.08 | 94 | 68 | 2.3 | 2.2 |
| 25 | 0.09 | 93 | 85 | 1.6 | 1.5 |
| 26 | 0.03 | 90 | 96 | 1.2 | 1.1 |
| 27 | 0.7 | 94 | 120 | 1.2 | 1.0 |

Electric Resistance: electric resistance for a width of 10 mm and a length of 100 mm.

EXAMPLE 9

The samples of Example 8 were Ni-plated in an Ni electroplating Watts bath at an electric current density of 10 A/dm$^2$ to form Ni films of 2 μm in thickness. The properties of the resulting samples are shown in Table 17.

TABLE 17

| Sample No. | Carbon Content (wt. %) | Porosity (%) | Electric Resistance (mΩ/100 mm) | Tensile Strength (kg/15 mm) | Elongation (%) |
| --- | --- | --- | --- | --- | --- |
| 21 | 0.05 | 94 | 37 | 3.6 | 4.9 |
| 22 | 0.04 | 94 | 40 | 3.5 | 4.7 |
| 23 | 0.09 | 93 | 51 | 2.7 | 2.8 |
| 24 | 0.08 | 93 | 59 | 2.5 | 2.2 |
| 25 | 0.09 | 92 | 73 | 1.7 | 1.6 |
| 26 | 0.03 | 89 | 88 | 1.3 | 1.2 |
| 27 | 0.7 | 93 | 112 | 1.3 | 1.0 |

Electric Resistance: electric resistance for a width of 10 mm and length of 100 mm.

Subsequently, the substrates shown in Table 17 were used to produce nickel electrodes for use in Ni-hydrogen batteries. They were filled with an active material principally comprising nickel hydroxide, and the surfaces thereof were then smoothed, followed by drying at 120° C. for 1 hour. The resulting electrodes were pressed under a pressure of 1 ton/cm$^2$ to have a length of 190 mm, a width of 210 mm and a thickness of 0.7 mm.

5 nickel electrodes for each sample, 6 conventional MmNi (misch metal nickel) hydrogen occlusion alloy electrodes as counterpart electrodes, and a polypropylene nonwoven fabric separator treated to be rendered hydrophilic were used to constitute a square-shaped closed nickel-hydrogen battery. An aqueous solution of caustic potash having a specific gravity of 1.3 containing 25 g/1 of lithium hydroxide dissolved therein was used as the electrolyte. Batteries Nos. 21B, 22B, 23B, . . . correspond to respective Samples Nos. in Table 17.

Each battery was examined with respect to discharge voltage and capacity at discharge currents of 10 A and 150 A, and was further evaluated with respect to capacity retention rate after 500 cycles each involving a 10 A discharge in a life test. The results are shown in Table 18.

TABLE 18

| Battery No. | 10 A Discharge | | 150 A Discharge | | Capacity Retention Rate after 500 |
| --- | --- | --- | --- | --- | --- |
| | V | Ah | V | Ah | Cycles (%) |
| 21B | 1.26 | 122 | 1.19 | 119 | 94 |
| 22B | 1.24 | 120 | 1.18 | 118 | 93 |
| 23B | 1.23 | 119 | 1.17 | 114 | 92 |
| 24B | 1.21 | 115 | 1.14 | 109 | 90 |
| 25B | 1.12 | 107 | 1.01 | 96 | 87 |
| 26B | 1.10 | 105 | 1.01 | 94 | 86 |
| 27B | 1.10 | 103 | 0.97 | 92 | 85 |

It has become apparent from the foregoing results that the battery electrode substrate of the present invention exhibits excellent properties.

EXAMPLE 10

Sample 22 of Example 8 was used to form substrates with varied Ni film thicknesses, which were used to produce Ni-hydrogen batteries according to the same procedure as in Example 9. They were examined with respect to capacity retention rate after 500 cycles each involving a 10 A discharge. The results are shown in Table 19.

TABLE 19

| Ni Film Thickness ($\mu$m) | Capacity Retention Rate (%) |
| --- | --- |
| 0.02 | 81 |
| 0.2 | 90 |
| 1.5 | 94 |
| 4.5 | 94 |

EXAMPLE 11

48.5 wt. % of an $Fe_2O_3$ powder as shown in Table 20 was blended with 1.5 wt. % of a graphite powder of 2 $\mu$m in an average particle size, 10 wt. % of an acrylic resin, 2 wt. % of carboxymethylcellulose and 38 wt. % of water. The blend was mixed with a ball mill for 12 hours to prepare a slurry. Subsequently, a polyurethane foam of 2.5 mm in thickness wherein the number of pores per inch was about 50 was dipped in the slurry, stripped of an excess of the attached component by roll squeezing, and dried in the air at 120° C. for 5 minutes to prepare a porous resin coated with the $Fe_2O_3$ powder, which was then heat-treated in a hydrogen stream at 1,070° C. for 5 minutes for sintering to form a porous Fe body. The properties of such porous Fe bodies were evaluated. The results are shown in Table 21.

TABLE 20

| Sample No. | Average Particle Size ($\mu$m) |
| --- | --- |
| 28 | 0.7 |
| 29 | 2.2 |
| 30 | 16 |
| 31 | 110 |

TABLE 21

| Sample No. | Carbon Content (wt. %) | Porosity (%) | Electric Resistance (m$\Omega$/100 mm) | Tensile Strength (kg/15 mm) | Elongation (%) |
| --- | --- | --- | --- | --- | --- |
| 28 | 0.03 | 95 | 51 | 3.5 | 4.8 |
| 29 | 0.04 | 94 | 54 | 3.3 | 4.4 |
| 30 | 0.06 | 93 | 62 | 2.3 | 2.5 |
| 31 | 0.03 | 90 | 91 | 1.2 | 1.0 |

Electric Resistance: electric resistance for a width of 10 mm and a length of 100 mm.

Samples shown in Table 21 were Ni-plated in an Ni electroplating Watts bath at an electric current density of 12 A/dm$^2$ to form Ni films of 3 $\mu$m in thickness. The properties of the resulting samples are shown in Table 22.

TABLE 22

| Sample No. | Carbon Content (wt. %) | Porosity (%) | Electric Resistance (m$\Omega$/100 mm) | Tensile Strength (kg/15 mm) | Elongation (%) |
| --- | --- | --- | --- | --- | --- |
| 28 | 0.03 | 94 | 38 | 3.7 | 4.9 |
| 29 | 0.04 | 93 | 41 | 3.5 | 4.4 |
| 30 | 0.06 | 92 | 55 | 2.6 | 2.3 |
| 31 | 0.03 | 89 | 73 | 1.3 | 1.2 |

Electric Resistance: electric resistance for a width of 10 mm and a length of 100 mm.

Subsequently, Ni-hydrogen batteries were produced according to the same procedure as in Example 9, and the properties thereof were evaluated. The results are shown in Table 23.

TABLE 23

| Battery No. | 10 A Discharge | | 150 A Discharge | | Capacity Retention Rate after 500 Cycles (%) |
| --- | --- | --- | --- | --- | --- |
| | V | Ah | V | Ah | |
| 28B | 1.25 | 123 | 1.20 | 120 | 94 |
| 29B | 1.24 | 121 | 1.18 | 119 | 93 |
| 30B | 1.21 | 116 | 1.14 | 110 | 92 |
| 31B | 1.14 | 110 | 1.09 | 104 | 91 |

EXAMPLE 12

Next, porous Fe bodies were formed according to substantially the same procedure as in Example 11 except that the amounts of the $Fe_2O_3$ powder and the carbon powder to be blended were varied as shown in Table 24. The $Fe_2O_3$ powder used herein was one of 0.7 $\mu$m in an average particle size. The properties of the porous Fe bodies obtained are shown in Table 25.

TABLE 24

| Sample No. | Amt. of $Fe_2O_3$ (wt. %) | Amt. of Carbon (wt. %) |
| --- | --- | --- |
| 32 | 49.97 | 0.03 |
| 33 | 47 | 3 |
| 34 | 37 | 13 |

TABLE 25

| Sample No. | Carbon Content (wt. %) | Porosity (%) | Electric Resistance (m$\Omega$/100 mm) | Tensile Strength (kg/15 mm) | Elongation (%) |
| --- | --- | --- | --- | --- | --- |
| 32 | 0.03 | 95 | 63 | 2.7 | 2.8 |
| 33 | 0.08 | 95 | 50 | 3.3 | 4.4 |
| 34 | 0.17 | 95 | 85 | 3.3 | 1.7 |

Electric Resistance: electric resistance for a width of 10 mm and a length of 100 mm.

Subsequently, the samples shown in Table 25 were Ni-plated in an Ni electroplating Watts bath at an electric current density of 10 A/dm$^2$ to form Ni films of 2.5 $\mu$m in thickness. The properties of the resulting samples are shown in Table 26.

TABLE 26

| Sample No. | Carbon Content (wt. %) | Porosity (%) | Electric Resistance (m$\Omega$/100 mm) | Tensile Strength (kg/15 mm) | Elongation (%) |
| --- | --- | --- | --- | --- | --- |
| 32 | 0.03 | 94 | 56 | 2.9 | 2.9 |
| 33 | 0.08 | 94 | 39 | 3.7 | 4.6 |
| 34 | 0.17 | 94 | 71 | 3.3 | 2.1 |

Electric Resistance: electric resistance for a width of 10 mm and a length of 100 mm.

Subsequently, Ni-hydrogen batteries were produced according to the same procedure as in Example 9, and the properties thereof were evaluated. The results are shown in Table 27.

TABLE 27

| Battery No. | 10 A Discharge V | 10 A Discharge Ah | 150 A Discharge V | 150 A Discharge Ah | Capacity Retention Rate after 500 Cycles (%) |
|---|---|---|---|---|---|
| 32B | 1.22 | 121 | 1.17 | 118 | 94 |
| 33B | 1.25 | 125 | 1.20 | 120 | 94 |
| 34B | 1.19 | 119 | 1.14 | 112 | 93 |

EXAMPLE 13

An $Fe_2O_3$ powder of 0.6 μm in an average particle size was used to prepare slurries at blending proportions as shown in Table 28. A polyurethane foam of 3 mm in thickness was dipped in each slurry, stripped of an excess of the attached component by roll squeezing, and dried in the air at 180° C. for 10 minutes to form a porous resin coated with the $Fe_2O_3$ powder.

Additionally stated, in every sample, the amount of slurry applied was controlled in such a way that the areal density of the resulting porous Fe body was 500 g/m².

TABLE 28

| Sample No. | Amount of $Fe_2O_3$ (wt. %) | Binder Resin Material | Binder Resin Residual Carbon Rate a (%) | Binder Resin Blended Amount (wt. %) | a × b | Amount of CMC Blended (wt. %) | Amount of Water Blended (wt. %) |
|---|---|---|---|---|---|---|---|
| 35 | 60 | phenolic resin | 60 | 12 | 12 | 2 | 26 |
| 36 | 60 | phenolic resin | 60 | 8 | 8 | 2 | 30 |
| 37 | 60 | phenolic resin | 40 | 10 | 6.7 | 2 | 28 |
| 38 | 60 | phenolic resin | 40 | 8 | 5.3 | 2 | 30 |
| 39 | 60 | phenolic resin | 40 | 4 | 2.7 | 2 | 34 |
| 40 | 60 | epoxy resin | 10 | 20 | 3.3 | 2 | 18 |

Subsequently, they were heated to 1,150° C. at a heat-up rate of 200° C./min in an $N_2$ stream, heat-treated at 1,150° C. for 5 minutes, and then heat-treated in a $H_2+N_2$ mixed gas (mixing ratio: 1:3) stream at 1,150° C. for 5 minutes to obtain porous Fe bodies.

Additionally stated, the heat treatment was continuously effected using a mesh belt type continuous heat treatment furnace, the heating zone of which had an $N_2$ gas atmosphere in the first half portion thereof and a $H_2+N_2$ gas atmosphere in the second half portion thereof. The properties of the porous Fe bodies obtained were evaluated. The results are shown in Table 29.

TABLE 29

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 35 | 0.25 | 95 | 75 | 0.9 | 1.3 |
| 36 | 0.02 | 95 | 48 | 2.3 | 4.3 |
| 37 | 0.02 | 95 | 47 | 2.1 | 4.5 |
| 38 | 0.01 | 95 | 54 | 1.8 | 4.2 |
| 39 | 0.01 | 95 | 69 | 1.3 | 1.8 |
| 40 | 0.01 | 95 | 71 | 1.1 | 1.1 |

Electric Resistance: electric resistance for a width of 10 mm and a length of 100 mm.

Subsequently, the samples shown in Table 29 were Ni-plated in an Ni electroplating Watts bath at an electric current density of 5 A/dm² to form Ni films of 1.1 μm in thickness. The properties of the resulting samples are shown in Table 30.

TABLE 30

| Sample No. | Carbon Content (wt. %) | Porosity (%) | Electric Resistance (mΩ/100 mm) | Tensile Strength (kg/15 mm) | Elongation (%) |
|---|---|---|---|---|---|
| 35 | 0.25 | 94 | 70 | 1.2 | 1.2 |
| 36 | 0.02 | 94 | 39 | 2.9 | 4.4 |
| 37 | 0.02 | 94 | 38 | 2.5 | 4.6 |
| 38 | 0.01 | 94 | 40 | 2.3 | 4.3 |
| 39 | 0.01 | 94 | 62 | 1.5 | 1.7 |
| 40 | 0.01 | 94 | 64 | 1.2 | 1.2 |

Electric Resistance: electric resistance for a width of 10 mm and a length of 100 mm.

Subsequently, Ni-hydrogen batteries were produced according to the same procedure as in Example 9, and the properties thereof were evaluated. The results are shown in Table 31.

TABLE 31

| Battery No. | 10 A Discharge | | 150 A Discharge | | Capacity Retention Rate after 500 Cycles (%) |
|---|---|---|---|---|---|
| | V | Ah | V | Ah | |
| 35B | 1.18 | 117 | 1.13 | 111 | 90 |
| 36B | 1.24 | 125 | 1.21 | 119 | 94 |
| 37B | 1.24 | 124 | 1.20 | 120 | 94 |
| 38B | 1.24 | 125 | 1.20 | 121 | 94 |
| 39B | 1.19 | 118 | 1.12 | 112 | 92 |
| 40B | 1.17 | 116 | 1.11 | 110 | 89 |

It has become apparent from the foregoing results that the battery electrode substrate of the present invention is excellent.

As described hereinbefore, according to the present invention, a battery electrode substrate decreased in residual carbon content and having excellent mechanical strength properties and electrical properties can be obtained at a low production cost.

What is claimed is:

1. A process for producing a battery electrode substrate, comprising: mixing a carbon powder and an iron oxide powder of at most 20 µm in an average particle size with a binder resin and a diluent to prepare a slurry; applying the slurry on a porous resin core body and then drying the same; thereafter effecting a heat treatment in a nonoxidizing atmosphere within a temperature range of 850° C. to 1,250° C. to remove the organic resin component while simultaneously sintering Fe to obtain a porous Fe body having a carbon content of at most 0.2 wt. % and a porosity of at least 90%; and then covering the surface of the Fe skeletal portion with Ni by Ni electroplating.

2. A process for producing a battery electrode substrate as set forth in claim 1, wherein the thickness of the resulting Ni covering layer is 0.1 µm to 10 µm.

3. A process for producing a battery electrode substrate as set forth in claim 1, wherein the iron oxide powder has an average particle size of at most 3 µm.

4. A process for producing a battery electrode substrate as set forth in claim 1, wherein the amount of the carbon powder present in the initial slurry is 0.1 wt. % to 20 wt. % based on the iron oxide powder.

* * * * *